3,528,924
PLASTIC CASE DESOILING PROCESS
Jaakko I. Tae, Sherman Oaks, and Archibald K. Beard, Rolling Hills, Calif., assignors to Purex Corporation, Ltd., Lakewood, Calif., a corporation of California
No Drawing. Filed Jan. 24, 1967, Ser. No. 611,242
Int. Cl. C11d 7/06
U.S. Cl. 252—156       16 Claims

ABSTRACT OF THE DISCLOSURE

A composition and method effective for removal of obdurate soil from surfaces of plastic articles such as tote boxes, agricultural lugs and soda cases, e.g. molded or formed of high density polyethylene or polypropylene are provided comprising contacting the surface with a mixture in an alkaline aqueous carrier of a composition consisting essentially of a permanganate compound such as potassium permanganate compond and a small but effective amount, e.g. 0.001% by weight of a highly or perfluorinated surfactant soluble in the carrier, such as a perfluorinated fatty carboxylic or sulfonic acid, e.g. nonadecafluorodecanoic acid or an alkali or alkaline earth metal salt or amide thereof.

BACKGROUND OF THE INVENTION

Development of low cost, tough synthetic plastics and high speed forming procedures has enabled penetration by plastics into use areas long dominated by traditional materials such as wood. In one outstanding example, tote boxes of all sorts such as grape lugs, tomato boxes, soda cases and materials handling containers, once made of wood are now available in blow molded, injection molded or vacuum formed plastic and in a wide variety of sizes and colors. Advantages of such structures include absence of nails, longer service life and even lower cost. In markets closest to the consumer, such as soda cases, attractiveness of coloration and legibility of advertising are important considerations. Cleanliness is of course important in agricultural and materials handling applications.

DESCRIPTION OF THE PRIOR ART

Difficulties have been experienced with progressive soil accumulation on plastic articles, such as reusable containers. Apparently the electrostatic condition of plastic materials such as the polyolefins causes tenacious adherence of all manner of soil, particularly carbonaceous soil to these theoretically chemically inert surfaces. After a brief use life, plastic containers may become unattractively discolored and advertising logos obscured by a virtually unremovable soil accumulation. Traditional cleaning techniques, such as those using synthetic detergents, only partially clean the plastic surfaces and actually remove only the easily removed portion of the soil to leave behind some quantity which quickly accumulates to an appreciable degree.

SUMMARY OF THE INVENTION

A composition effective in an aqueous alkaline carrier for removal of obdurate soil from synthetic organic plastic surfaces has been discovered consisting essentially of a mixture of a permanganate compound selected from alkali and alkaline earth metal permanganates and a small but effective amount of a highly fluorinated compound soluble in the carrier and selected from highly fluorinated and perfluorinated fatty carboxylic and sulfonic acids, their alkali and alkaline earth metal salts and amide derivatives.

Method is also provide which includes cleaning synthetic organic plastic surfaces by contacting the surface with an aqueous alkaline solution of the composition above described, at a temperature above 50° F. and preferably from 100° to 210° F. It is particularly effective to employ the method and composition solution of the present invention as a portion of a conventional cleaning cycle in which the plastic articles are selectively treated as required, e.g. as by immersion in the composition solution and thereafter cycled through a detergent cleaning operation.

DESCRIPTION OF THE PREFERRED EMBODIMENTS

The aqueous alkaline carrier for the present composition contains an alkali metal compound which in solution gives free alkali metal hydroxide, e.g. lithium, potassium or sodium hydroxide with the last being preferred. A substantial amount of alkali is employed to obtain the high pH values desirable for proper functioning of the composition. The pH of the composition solutions hereof is maintained substantially above 12, and is generally not less than 13. Solutions of alkali which are preferred have pH values above about 13.5 and higher. At such high pH values it is more common practice to describe the alkalinity in terms of percent sodium or potassium hydroxide or some other equivalent alkali metal hydroxide. The amount of alkaline material employed in the composition may range in amount to levels sufficient to give, in solution, from about 0.24% to less than about 45% by weight alkali metal hydroxide. In most composition solutions, from about 18% to 22% by weight of alkali metal hydroxide is present to provide the desired high alkalinity.

The permanganate compound of the present composition has the general formula $Me(MnO_4)_x$ in which Me represents a mono- or divalent-metal ion having an atomic weight less than 41 such as the alkali and alkaline earth metals having such weights, i.e. lithium, beryllium, sodium, magnesium, potassium and calcium and $x$ is an integer equal to the valence of Me and is one to two; potassium permanganate is the preferred permanganate compound.

The portion of permanganate in the composition can be varied to provide, in solution, from 0.24% to about 15% by weight.

It has been found that for practical rates of cleaning it is highly desirable to employ a surfactant material soluble in the carrier and resistant to degradation in a caustic, oxidizing environment. Suitable materials have the general formula $R_f$—(G)—Z in which Z in a member selected from: amino, i.e. $NH_2$—; hydroxyl; and alkali metaloxy radicals, specifically LiO-, NaO- and KO-radicals; G is a divalent radical selected from —CO—, carbonyl, and —$SO_2$—, sufonyl, and $R_f$ is a highly fluorinated alkyl radical containing from 5 to 14 carbon atoms, i.e. has the formula $HC_nF_{2n}$, or in which $R_f$ is a perfluoroalkyl radical containing from 5 to 14 carbon atoms, i.e. has the formula, $C_nF_{2n+1}$. In each formula $n$ is an integer from 5 to 14. $R_f$ is thus seen to have the generic formula $H_pC_nF_{2n+m}$ in which $m$ and $p$ are integers one of which has a value of 1 and the other a value of 0. USP 2,599,629 to Berry discloses such acids and salts. Among the G–Z radicals contemplated there may be mentioned carboxyl, alkali metal carboxylates, carboxamides, sulfonyl, alkali metal sulfonates and sulfonamides. Among the fluorinated moieties all of which have no more than one replaceable hydrogen, i.e. no more than one hydrogen atom substituent which may be supplanted by a fluorine atom there may be mentioned highly and perfluorinated pentyl, hexyl, heptyl, caprylyl, pelargonyl, capryl, undecanyl, lauryl, tridecanyl and myristyl radicals and like highly and perfluorinated analogs of higher alkyl radicals. The amount of fluorinated compound employed can be widely varied depending on water conditions, quantity and type of soil to be removed, temperature of application, nature of the soiled substrate and available time for exposure. In general, because of their high cost, a minimum amount of highly or perfluorinated material is employed, e.g. about 0.001% up to about 0.3% and above, e.g. to about 10% based on the weight of the composition.

In carrying out the invention in a preferred manner, a dry mix of the composition consisting essentially by weight of sodium hydroxide 4–95%, potassium permanganate 4–40% and a perfluorinated fatty carboxylic acid such as nonadecafluorodecanoic acid 0.001 to .3% is dissolved in water at a concentration of 0.5 to 4 pounds of the composition per gallon of solution or 8 to 64 oz. of composition per gallon, which is a 6 to 48% solution of the inventive composition on a weight per volume basis. This provides a cleaning solution containing by weight from 0.24 to 45.6 sodium hydroxide, 0.24 to 14.4% potassium permanganate and 0.00006 to 0.108% perfluorinated acid. Desoiling is carried out by contacting this solution with the plastic surfaces by dipping, heavy spraying, flooding or otherwise applying and draining. Following conditioning in the just described manner, the molded articles, which can be fabricated of any moldable organic plastic material including polyolefins, polyesters and polyamides are desirably subjected to a cleansing with a conventional cleaning material. Such conventional materials will include aqueous solutions of synthetic organic and inorganic detergents such as are produced by the introduction of alkylene oxide groups into an organic hydrophobic compound or group having an aliphatic or aromatic structure and containing from 8 to about 30 carbon atoms, as well as polyoxyalkylene esters of organic acids such as the higher fatty acids, resin acids and tall oil acids, especially the polyglycol esters of lauric and stearic acids. Other non-aromatic detergents include the polyalkylene oxide condensate with higher fatty acid amides and the polyoxyalkalene oxide ethers of higher aliphatic alcohols, as well as the higher fatty acid alkyl amides. The anionc aromatic detergents, e.g. water soluble higher alkyl aryl sulfonate detergents, particularly those having from 8 to 15 carbon atoms in the alkyl group can also be employed as can aliphatic detergents such as the normal and secondary higher alkyl sulfate detergents such as lauric sulfate. Cationic detergents such as primary fatty amines such as lauric amine and myristic amine can also be employed.

Alkaline builders such as metal hydroxides and salts, e.g. silicates, carbonates, borates and orthophosphates; water conditioners such as sequestering agents both organic and inorganic, polyphosphates such as pyrophosphates, tripolyphosphates and glassy polyphosphates and aminopolycarboxylates such as ethylenediamine tetraacetic acid can be added for their conventional purposes in conventional amounts.

Example 1

Molded high density polyethylene soda cases were cleaned of obdurate primarily carbonaceous soil which had proved impervious to detergent solution by immersion of the article in an aqueous solution of a composition comprising

| Composition: | Percent by weight |
| --- | --- |
| NaOH | 36.0 |
| Potassium permanganate | 30.0 |
| Nonadecafluorodecanoic acid | 0.3 |
| Flow Agent ($Na_2CO_3$) | 33.7 | at a concentration of 2 pounds of the composition per gallon of water. Solution pH was above 13.5. Solution temperature at contact was 210° F. After only 30 seconds immersion the soda case was relieved of blackening soil and following cycling through a commercial tunnel type washer using a built solution of an alkyl aryl sulfonate detergent, the case was sparkling clean.

Example 2

Example 1 was duplicated but with the cleaning bath at 140° F. Equivalent cleaning results were obtained with 50 minutes immersion in the lower temperature bath.

Example 3

Example 1 was duplicated but with the concentration of cleaning composition reduced to 0.5 pound per gallon and the temperature of the bath at 190° F. Immersion time of 5 minutes proved sufficient to clean the case.

Example 4

A bottle carrier "six-pack" formed of sheeted polypropylene and soiled by use was immersed in a bath having the composition of Example 1 at a concentration of 4 pounds per gallon of water and at a temperature of 140° F. Immersion for 4 minutes cleaned the carriers.

No damage to silk screened logos and decorations was noted in the above tests.

Example 5

Example 1 is duplicated employing KOH, lithium permanganate and perfluorinated potassium octanoate. Results are similar.

Example 6

Example 1 is duplicated employing perfluorinated lauryl amide. Results are similar.

Examples 7–12

Example 1 is duplicated employing 0.01, 0.1, 0.2, 0.3 and 5% by weight of the perfluorinated compound. Reduced cleaning times are noted as concentration of this compound is increased but the rate of improvement above 0.3% is much lessened.

Example 13

Example 1 is repeated but with varying amounts of NaOH from 4% to 95% by weight. Cleaning action is improved with increasing caustic concentration to 36% and is best when at equal concentration with the permanganate and the solution pH is above 13.

Example 14

Example 1 is repeated but with varying amounts of $KMnO_4$ from 4% to 40% by weight. Cleaning action is improved with increasing $KMnO_4$ concentration to about 36% and is best when at equal concentration with the caustic.

Example 15

Example 1 is duplicated but employing octadecafluorodecanoic acid as the surfactant. Results are similar.

Example 16

Example 1 is duplicated but employing perfluorolaurylsulfonamide as the surfactant. Results are similar.

As indicated in the examples, it is desirable to incorporate an amount of a free flowing powder in the dry mix of the present composition if the hydroscopic tendencies of the caustic and/or handling or storage conditions make cluumping or stratification of the mix likely. Generally the water soluble carbonates can be used for this purpose particularly sodium and potassium carbonates which are compatible and especially useful with sodium and potassium hydroxides which may otherwise cake and lump together. Alkaline earth metal hydroxides do not exhibit these tendencies to an extent making presence of alkali metal carbonates desirable.

The terms "consists essentially of" or "consisting essentially of" herein are inclusive of the characterizing components of the novel composition and exclude unnamed ingredients destructive of the nature of the composition or its purpose. These phrases, however, do permit the presence of other ingredients even in considerable amounts which do not render the composition unfit for its intended purpose of soil removal from plastic surfaces.

We claim:

1. Method effective for removal of obdurate soil from synthetic organic plastic surfaces which includes contacting the surface at a temperature between about 50° F. and 210° F. with an aqueous solution at a concentration of 6 to 48% by weight of a composition consisting essentially by weight of 4 to 95% alkali metal hydroxide, 4 to 40% alkali metal or alkaline earth metal permanganate and at least about 0.001% up to 10% of a fluorinated surfactant soluble in the aqueous solution and having the formula $R_f$—(G)—Z in which Z is selected from amino, hydroxyl and alkali metaloxy radicals, G is a divalent radical selected from —CO— and —$SO_2$— radicals and $R_f$ is a fluorinated alkyl radical having the formula $H_pC_nF_{2n+m}$ in which $m$ and $p$ are integers, one of which has a value of 1 and the other a value of 0 and $n$ is an integer from 5 to 14 inclusive.

2. Method according to claim 1 in which said permangate has the general formula $$Me(MnO_4)_x$$

in which Me represents said metal and has an atomic weight less than 41 and is selected from the alkali and alkaline earth metals and $x$ is an integer equal to the valence of Me.

3. Method according to claim 2 in which said permanganate is an alkali metal permanganate.

4. Method according to claim 3 in which said alkali metal is potassium.

5. Method according to claim 1 in which said fluorinated compound contains a perfluoroalkyl moiety.

6. Method according to claim 5 in which G is a carbonyl radical and Z is a member selected from amino, hydroxyl and alkali metaloxy radicals.

7. Method according to claim 6 in which said fluorinated compound is present in amounts between above 0.001 and 0.3% by weight.

8. Method according to claim 7 in which Z is an amino radical.

9. Method according to claim 7 in which Z is an alkali metaloxy radical.

10. Method according to claim 7 in which Z is a hydroxyl radical.

11. Method according to claim 10 in which said fluorinated compound contains from 9 to 12 carbon atoms.

12. Method according to claim 10 in which said fluorinated compound is nonadecafluorodecanoic acid.

13. Method according to claim 1 including contacting said composition at a temperature between 100° and 210° F.

14. Method according to claim 13 including contacting said surfaces with an aqueous detergent solution following application of said composition.

15. Method according to claim 1 including immersing a part having a molded synthetic organic plastic surface in said composition.

16. Method according to claim 15 in which said surface comprises polyolefin plastic.

References Cited

UNITED STATES PATENTS

| | | | |
|---|---|---|---|
| 2,559,629 | 7/1951 | Berry | 260—408 |
| 2,951,051 | 8/1960 | Tiers | 260—539 |
| 3,000,829 | 9/1961 | Arden | 252—103 |
| 3,019,261 | 1/1962 | Pascal | 252—357 |
| 3,119,720 | 1/1964 | Stiles et al. | 252—156 |
| 3,293,148 | 12/1966 | Dell et al. | 252—156 |
| 3,311,566 | 3/1967 | Hauptschein et al. | 252—356 |

LEON D. ROSDOL, Primary Examiner

W. E. SCHULZ, Assistant Examiner

U.S. Cl. X.R.

134—39